(12) United States Patent
Mock

(10) Patent No.: US 10,122,536 B2
(45) Date of Patent: Nov. 6, 2018

(54) CENTRAL CERTIFICATE MANAGEMENT

(71) Applicant: Totemo AG, Kusnacht (CH)

(72) Inventor: Marcel Mock, Egg (CH)

(73) Assignee: TOTEMO AG, Küsnacht (CH)

( * ) Notice: Subject to any disclaimer, the term of this patent is extended or adjusted under 35 U.S.C. 154(b) by 229 days.

(21) Appl. No.: 15/088,339

(22) Filed: Apr. 1, 2016

(65) Prior Publication Data

US 2016/0294564 A1 Oct. 6, 2016

(30) Foreign Application Priority Data

Apr. 2, 2015 (EP) .................................... 15162466

(51) Int. Cl.
*G06F 21/00* (2013.01)
*H04L 9/32* (2006.01)
*H04L 9/00* (2006.01)
*H04L 9/14* (2006.01)
*H04L 9/30* (2006.01)

(52) U.S. Cl.
CPC ............ *H04L 9/3263* (2013.01); *H04L 9/007* (2013.01); *H04L 9/14* (2013.01); *H04L 9/30* (2013.01); *H04L 9/321* (2013.01); *H04L 9/3265* (2013.01)

(58) Field of Classification Search
CPC . H04L 9/3263; H04L 9/14; H04L 9/30; H04L 9/007; H04L 9/3265; H04L 9/321
See application file for complete search history.

(56) References Cited

U.S. PATENT DOCUMENTS

| | | | |
|---|---|---|---|
| 2002/0147905 A1* | 10/2002 | Perlman | H04L 9/3265 713/157 |
| 2003/0163687 A1 | 8/2003 | Dare | |
| 2005/0114652 A1* | 5/2005 | Swedor | H04L 63/0442 713/156 |
| 2006/0282670 A1 | 12/2006 | Karchov | |
| 2010/0185849 A1* | 7/2010 | Rune | G06F 21/445 713/156 |

FOREIGN PATENT DOCUMENTS

EP 1 536 601 B1 6/2005

* cited by examiner

*Primary Examiner* — Kendall Dolly
(74) *Attorney, Agent, or Firm* — Pearne & Gordon LLP

(57) ABSTRACT

Certificate management method for a plurality of clients, the method including: receiving a first certificate for a subject including a public key, an issuer field with an issuer and a serial number field with a serial number, wherein the first certificate for the subject is signed by a first certificate for the issuer; generating a second certificate for the subject including the public key, an issuer field with the issuer and a serial number field with the serial number, wherein the second certificate for the subject is signed by a second certificate for the issuer being different to the first certificate for the issuer; and transmitting the second certificate for the subject to one of the plurality of clients; and performing an action on the basis of the public key of the second certificate for the subject.

19 Claims, 6 Drawing Sheets

CENTRAL CERTIFICATE MANAGEMENT

FIELD OF THE INVENTION

The present invention concerns a central certificate management.

DESCRIPTION OF RELATED ART

S/MIME is a common standard used for the encryption of emails between a sender and a recipient. S/MIME is an asymmetric encryption which uses a pair of a public key and a private key. The public key of the recipient is given to all senders for encrypting emails sent to the recipient. However, only the recipient has the corresponding private key necessary to decrypt the encrypted email of the sender. In order to assure at the sender side that the public key is indeed coming from the recipient and not from a third party, the public key is transmitted in a certificate, e.g. with the standard X.509. The certificate comprises the public key of the recipient, an issuer field with information about a trust-worthy issuer of the certificate and a subject field with information of the recipient. The certificate is finally digitally signed by a certificate for the issuer. FIG. 1 shows such a situation, where the recipient sends a certificate with its public key. The sender checks the validity of the certificate. This is done by checking the signature of the received certificate on the basis of the certificate for the issuer used to sign the certificate for the recipient and by checking, if a copy of the certificate for the issuer is in a list of trusted certificates. If the validity is confirmed, the public key is used to encrypt a message, e.g. an email. Finally, the encrypted message is sent to the recipient which can then decrypt the message by its corresponding private key.

However, often the recipient's certificates are not directly issued/signed by a trust-worthy issuer, but by so-called intermediates whose trust-worthiness is then guaranteed by another issuer. FIG. 2 shows such a certificate chain. A root issuer has a certificate which is normally signed by himself, i.e. the issuer field and the subject field are identical for the root certificate. The root issuer issues a certificate for an intermediate signed by the certificate for the root issuer. The issuer field of the intermediate certificate contains the root issuer and the subject field of the intermediate certificate the intermediate. The intermediate can then issue the certificate for the recipient signed by the certificate for the intermediate. The issuer field of the certificate for the recipient contains the intermediate and the subject field of the certificate for the recipient the recipient. The number of levels between the recipient and the root issuer is arbitrary. The root certificate is also called trust anchor of such a certificate chain. This is also called certificate path or certificate chain.

FIG. 3 shows now the validation process of the certificate chain. When the message client receives the certificate for the recipient, it goes up the hierarchy of the certificates, until a trust anchor is found. The trust anchor is the first certificate of the certificate chain whose copy is in the list of trusted certificates. This is often the root certificate, but can also be an intermediate certificate being in the list of trusted certificates. Therefore, all certificates of the chain (until the trust anchor) must be present at the sender. The information of the next higher level can be found in the certificate itself. If the certificate of the next higher level is not present, in some cases it can be downloaded from a predetermined access location on the basis of Authority Information Access (AIA) extension. This process is called chain construction. If no trust anchor is found, the validity of the certificate chain cannot be checked. If a trust anchor is found, i.e. in the case the root certificate or an intermediate certificate is in the list of trusted certificates, the validity of the certificate chain is controlled by the so-called chain validation process. As shown in FIG. 2, the validity of each certificate of the certificate chain is then checked starting from the top to the bottom based on the next higher certificate, respectively. Among others, the authentication is checked on the basis of the next higher certificate and it is checked, if the issuer field corresponds the next higher subject field. In this case, the signature of the certificate for the intermediate is controlled on the basis of the signature of the certificate for the root certificate (here the trust anchor). Then, the signature of the certificate for the recipient is controlled on the basis of the signature of the certificate for the intermediate. If the validation was successful, a message can be encrypted by the certificate of the recipient. However, this process is complex and error-prone. Common errors are that no trust anchor is found and that the certificate chain cannot be constructed because of missing certificates and because of missing AIA information. The AIA is optional and is therefore often missing in certificates.

Especially for large companies with many message clients, it is desirable to manage the certificates for the recipients at a central certificate management server. This reduces the administrational effort and improves control. However in many message systems, the message is only encrypted when it passes the gateway of the internal system. Therefore, the message could be easily intercepted between the sender and the gateway of the message system. It was a desire to also encrypt the message between the sender and the gateway. It was proposed in EP1536601 to encrypt the message between the sender and the gateway by a proforma certificate for the recipient with a different public key than in the certificate for the recipient. This allowed to decrypt the message at the gateway, perform some operations on the message and send the message encrypted by the true certificate for the recipient from the gateway to the recipient. This allows an encryption from the sender to the recipient.

However, there are situations where it is desirable to realise for a central certificate management an end-to-end encryption from the sender to the recipient without a change of encryption at the gateway, e.g. for increased security. FIG. 4 shows such a situation. The central certificate management server 4 sends upon request of a sending message client a certificate for the recipient to the sender. The sender checks the validity of the certificate as described above, encrypts the message with the public key contained in the certificate for the recipient, and sends the encrypted message to the recipient. The problem with this approach is that the central management server 4 sends only the certificate for the recipient back. The sending message client has still to perform the chain construction, retrieve all higher level certificates, if not already present, and perform the chain validation. Consequently, the main administrational burden is still at the sending message clients and the process is equally error-prone as a decentralized management of certificates.

Similar problems arise for checking the validity of signatures of messages on the basis of a certificate for a sender. In general, the state of the art check of validity of certificates of subjects is error-prone and complex.

US2006/0282670 discloses a system for authorizing user requests by a combination of user credentials and a user certificate. It is suggested to change the validation process for the user certificate such that also self-signed user certificates are accepted.

US2002/0147905 discloses to shorten long certificate chains by the trust-anchor authority.

US2003/0163687 discloses an alternative certificate validation process which avoids the certificate of the trust-anchor.

BRIEF SUMMARY OF THE INVENTION

It is an object of the invention to provide certificate management for subjects which reduces the errors at the clients.

This is solved by the independent claims, especially by transmitting from a certificate management system to a client instead of the true certificate of the subject, another certificate with the same public key, the same issuer field and the same serial number field, but signed with another certificate. This allows for multiple subjects with several different trust anchors for their certificates to use always the same trust anchor within the certificate management system. Therefore, the number of trust anchors to be downloaded, stored and checked at the clients can be reduced to one. Since the process of retrieving certificates from third parties is often failing, this solution reduces the errors for checking the validity of a certificate at a client enormously.

The dependent claims refer to further advantageous embodiments.

In one embodiment, the step of performing an action on the basis of the first public key of the second certificate for the first subject includes encrypting a message with the public key of the second certificate for the first subject and sending the encrypted message to the first subject.

In one embodiment, the step of performing an action on the basis of the first public key of the second certificate for the first subject includes checking a digital signature of a document on the basis of with the public key of the second certificate for the first subject.

In one embodiment the client(s) is/are email client(s).

In one embodiment the first certificate for the subject and the second certificate for the subject are x.509 certificates. These certificates are configured for encrypting an S/MIME encrypted email and/or for checking the signature of an email.

BRIEF DESCRIPTION OF THE DRAWINGS

The invention will be better understood with the aid of the description of an embodiment given by way of example and illustrated by the figures, in which.

DETAILED DESCRIPTION OF POSSIBLE EMBODIMENTS OF THE INVENTION

Figure 1:
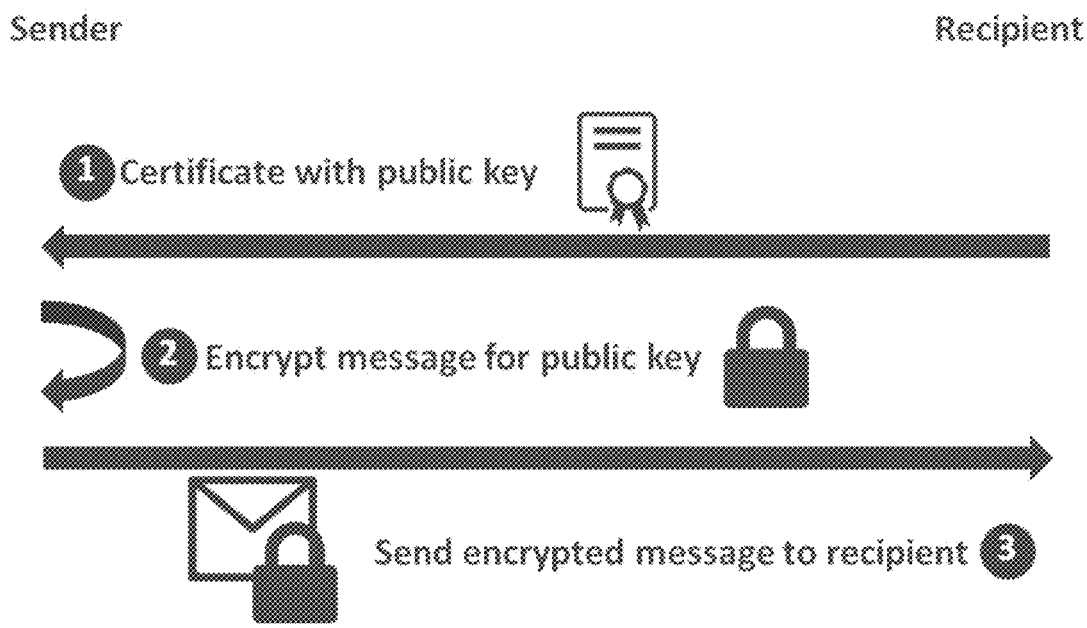
FIG. 1 shows a prior art process for end-to-end encryption with decentralized certificate management.

Before describing possible embodiments of the invention, the following terms shall be defined in more detail.

A key pair consists of a public key and a private key. The public key can be used to encrypt a message or document for the owner of the private key and/or to check the authentication of a message or document signed by the private key. The corresponding private key can be used to decrypt a message or document encrypted by the public key and/or to digitally sign a message or document by a private key.

Asymmetric encryption shall be any encryption using a key pair, i.e. using a public key for encryption and a private key for decryption. This includes also hybrid encryption methods like for example S/MIME which encrypt the message or document by a (randomly created) symmetric key, encrypt the symmetric key by the public key, decrypt the symmetric key by the private key and decrypt the message or document by the decrypted symmetric key.

The term signature or to sign is used herein in the sense of a digital signature of an electronic message or document. Therefore, the message or document is signed by a private key of a key pair. This allows to authenticate the message or document by the public key of said key pair. Often public keys used for authentication of a signature are contained in a certificate. For the sake of brevity, in this invention the formulation "to sign a document (often another certificate) with/by a certificate" is used in the sense of "to sign a document (often another certificate) with the private key corresponding to the public key contained in the certificate".

A certificate contains certificate data and a signature. The certificate data comprise a public key of a key pair, an issuer field and serial number. The certificate data are signed by another certificate for the issuer indicated in the issuer field of the certificate data. The combination of the certificate data and the signature provides the certificate. The issuer field identifies the entity that has signed and issued the certificate. This could be a name of the issuer, preferably a non-empty distinguished name (DN), an identification code/number of the issuer, the postal address of the issuer, the electronic address of the issuer (e.g. email or internet address), etc. or any combination or sub-combination of those. The issuer is sometimes also called Certificate Authority (CA). The serial number field identifies the certificate among the certificates issued by the issuer indicated in the issuer field. In one embodiment, the serial number is a positive integer. However in other embodiments, the serial number field could contain also alpha-numeric codes and/or negative integers. In one embodiment, the certificate follows the X.509 of the International Telecommunication Union Standardization Sector (ITU-T) which is hereby included by reference. In one embodiment, the certificate follows the structure defined in rfc5280 in the version of May 2008 which is hereby included by reference and in which the certificate data are referred to as TBSCertificate. The certificate data can contain other fields. In one embodiment, the certificate date could contain a subject field identifying the entity (subject) associated with the public key stored in the certificate data. The subject name may be carried in the subject field and/or an extension like the subjectAltName extension. In the following both possibilities shall be included, when we talk about the subject field. The subject field could be a name of the subject, an identification code/number of the subject, the postal address of the subject, the electronic address of the subject (e.g. email or internet address), etc. or any combination or sub-combination of those. Even if RFC5280 considers two distinct fields for the subject name and for the subject email address, they shall here not be treated separately. Possible additional fields of the certificate data are a version field with the version of the certificate standard, an algorithm ID field, a validity field with a validity period for the certificate, a public key algorithm field indicating the algorithm used for the key pair, an extension field or several extension fields. One possible extension is the Authority Information Access (AIA) extension. This extension contains the access address for downloading the certificate for the issuer of the certificate which allows a message client to automatically download the certificate of the issuer, if not already present at the message client. The AIA extension could be a HTTP Uniform Source Identifier (URI) or a Lightweight Directory Access Protocol (LDAP) URI or an FTP URI or other protocol addresses. The AIA can point to a .cer file that is a single DER encoded certificate as specified in RFC 2585 (this contains normally the issuer certificate) or to .p7c file that is a "certs-only" CMS message as specified in RFC 2797. The .p7c can contain one or more certificates; this means that it could contain the issuer certificate, the issuers issuer certificate, . . . , and even the root certificate. Details about the AID extension are defined in RFC 4325 which is hereby incorporated by reference. One AIA extension could be also configured to download also several certificates of a certificate chain. It is also possible to add several AIA extension for different certificates.

A certificate chain comprises at least two certificates at different levels. Each certificate at the one level is issued by the owner of the certificate of the next higher level and is signed by the certificate of the next higher level except for the certificate at the highest level (=root certificate). The issuer field of each certificate matches the subject field of the certificate in the higher level except for the certificate at the highest level. The certificate of the highest level, also called the root certificate, is normally issued by itself and/or signed by itself. The details for the validation of a certificate chain has already been explained in the context of FIGS. 2 and 3 and is not repeated for the sake of brevity.

If the claims mention a first something it shall not be implied that there exists also a second something unless the second something is explicitly defined in this claim.

Figure 5:
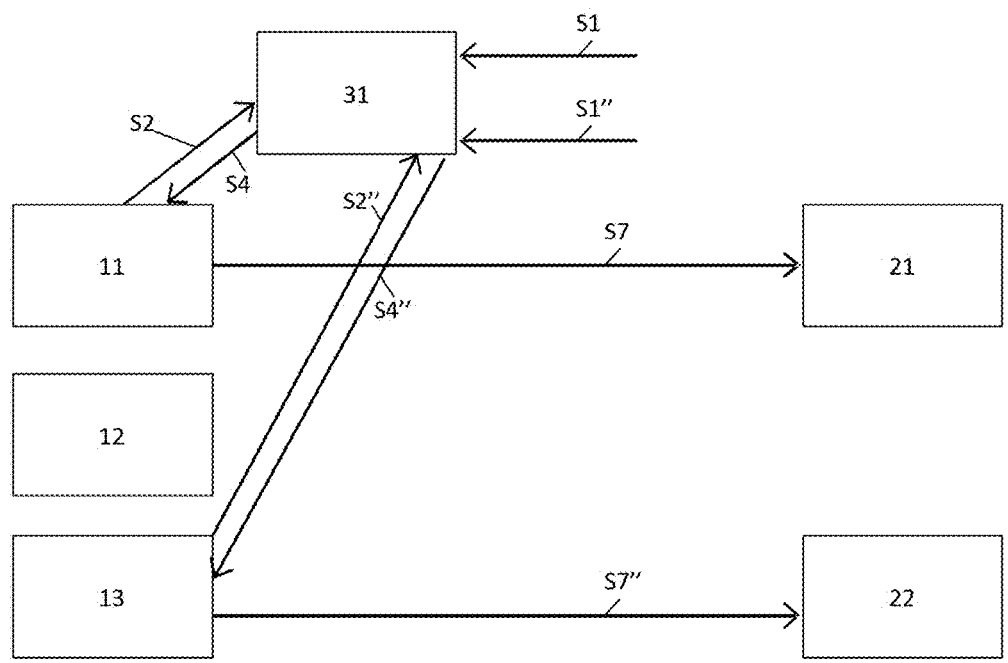
FIG. 5 shows an embodiment of a message system with centralized certificate management.

FIG. 5 shows an embodiment for a message system comprising a plurality of message clients 11, 12, 13, a certificate management system 31 and a plurality of subjects 21, 22.

The plurality of message clients 11, 12, 13 are each configured to validate a certificate for a subject 21, 22 and to perform an action on the basis of the public key of the validated certificate for the subject 21, 22. Such an action could be to encrypt a message for the recipient as subject 21, 22 on the basis of the validated certificates for the recipient 21, 22 and to send the encrypted message to the recipient 21, 22. In another embodiment, the action could be to check the validity of a signature, e.g. of a received message from a sender as the subject 21, 22, on the basis of the public key of the certificate for the subject 21, 22. In the letter case, the subject 21, 22 might be the sender of a message digitally signed by the certificate for the subject. However, any other actions on the basis of the public key of the certificate for the subject are also possible. In one embodiment, the plurality of message clients 11, 12, 13 is each configured to request a certificate for a subject 21, 22, if needed. This request can be sent to a local storage for certificates or to the certificate management system 31. In one embodiment, the plurality of message clients 11, 12, 13 are each configured to store certificates for subjects 21, 22 locally and to check before performing said action, if a valid certificate for a desired subject 21, 22 is stored in the message client 11, 12, 13. If such a certificate is present, the validation and/or the action can be performed without contacting the certificate management system 31. Otherwise, a request for the certificate for the subject 21, 22 is sent to the certificate management system 31 from which the requesting message client 11, 12, 13 will receive the requested certificate for the subject 21, 22. In another embodiment, the certificates are not stored locally and each time the message client 11, 12, 13 wants to send an encrypted message to a recipient 21, 22 or wants perform another action regarding a subject 21, 22, the message client 11, 12, 13 needs to send a corresponding request to the certificate management system 31. In one embodiment, the message clients are each configured to receive a certificate for a subject 21, 22 from the certificate management system 31. This can be realized either by a reply to the above mentioned request. However, also other ways of receiving a certificate are possible, e.g. by a push message of the server, a message with a V-card containing the certificate, a message with an annexed certificate. The message clients 11, 12, 13 can be different devices like computers, notebooks, touch pads, smart phones, or any other device configured to operate a message client software. The message clients 11, 12, 13 can be for example refer to distinct users. Two or more of the message clients 11, 12, 13 can also be arranged on the same device, e.g. for different users. In one embodiment, the message clients 11, 12, 13 are email clients. FIG. 5 shows only three exemplary message clients. It is however clear that the plurality of message clients 11, 12, 13 managed by the certificate management system 31 can have any number of message clients 11, 12, 13.

The certificate management system 31 is configured to manage certificates for the plurality of message clients 11, 12, 13. The certificate management system 31 is configured to receive a first certificate for a subject 21, 22 (see also step S1, S1" below). The certificate management system 31 is configured to generate a second certificate for said subject 21, 22 for which the first certificate was received (see more details with step S3, S3" below). The certificate management system 31 is configured to transmit the second certificate for the subject 21, 22 (see also step S4, S4" below) to at least one of the plurality of message clients 11, 12, 13. In one embodiment, the certificate management system 31 is configured to receive a request for a certificate for the subject 21, 22 from one of the plurality of message clients 11, 12, 13 (see also step S2" below). In one embodiment, the certificate management system 31 is configured to store for all subjects 21, 22 the second certificates generated. This has the advantage that if the same or another message client 11, 12, 13 requests the certificate for a subject 21, 22, for which the second certificate was already generated, a new generation of the second certificate for the subject 21, 22 can be avoided and the same previously generated second certificate which was stored in the certificate management system 31 can be retrieved and sent back to the requesting message client 11, 12, 13. But the invention shall not be restricted to this and the certificate management system 31 could also create the second certificates for the subjects 21, 22 each time, when needed. The certificate management system 31 can be implemented in one or several processing devices like a computer, a server, appliances, small devices like raspberry PI and other processing devices.

In one embodiment, all of the plurality of message clients 11, 12, 13 and/or their respective devices can be arranged in an internal network, like a Local Area Network (LAN) or a Wireless LAN (WLAN), so that no external network, like the internet or a mobile telephone network (GSM, GPRS, UMTS, LTE, . . . ) is needed to contact the certificate management system 31. In another embodiment, some or all of the message clients 11, 12, 13 are connected via an external network to the certificate management system 31. It is also possible that different subgroups of email clients 11, 12, 13 are arranged in distinct internal networks, wherein each distinct internal network (or at least some of them) has one or more certificate management server for managing the certificates for the sub-group of message clients 11, 12, 13 connected in this internal network. The different certificate management servers for the different sub-groups form together the certificate management system 31. In one embodiment, different certificate management servers of the same certificate management system 31 could synchronize their stored second certificates for the requested recipients.

The subjects 21, 22 are the entities associated to the public key stored in the certificate for the subject 21, 22. Technically often a device or an application is related to such a subject, e.g. by a user log-in. In an embodiment of end-to-end encryption, the subjects 21, 22 correspond to recipients of the encrypted messages. The messages are sent to message addresses related to the recipient 21, 22. The message client or device of the recipients 21, 22 receiving said encrypted message are configured to receive messages, to decrypt messages encrypted by their public key on the basis of the corresponding private key of the corresponding key pair. In one embodiment, the recipient's 21, 22 client is configured to identify the certificate used for encrypting the message. The latter could be done be checking information of the certificate used for encryption, which are included in the encrypted message. In one embodiment, the issuer field and the serial number field of the certificate is included in the encrypted message and used for checking the encrypted message at the recipient's client. This is for example the case for S/MIME encrypted messages, in particular for S/MIME encrypted emails. However, it is also possible that the recipient's client simply tries all available private keys to decrypt the message. In another embodiment, the subject 21, 22 is actually a sender of a message signing the message with a first certificate for the subject 21, 22. The subject's 21, 22 client is in one embodiment not managed by the certificate management system 31, i.e. he is an external subject 21, 22. However, it is also possible that the subject's 21, 22 client is one of the plurality of message clients 11, 12, 13 managed by the certificate management system 31.

Figure 7:
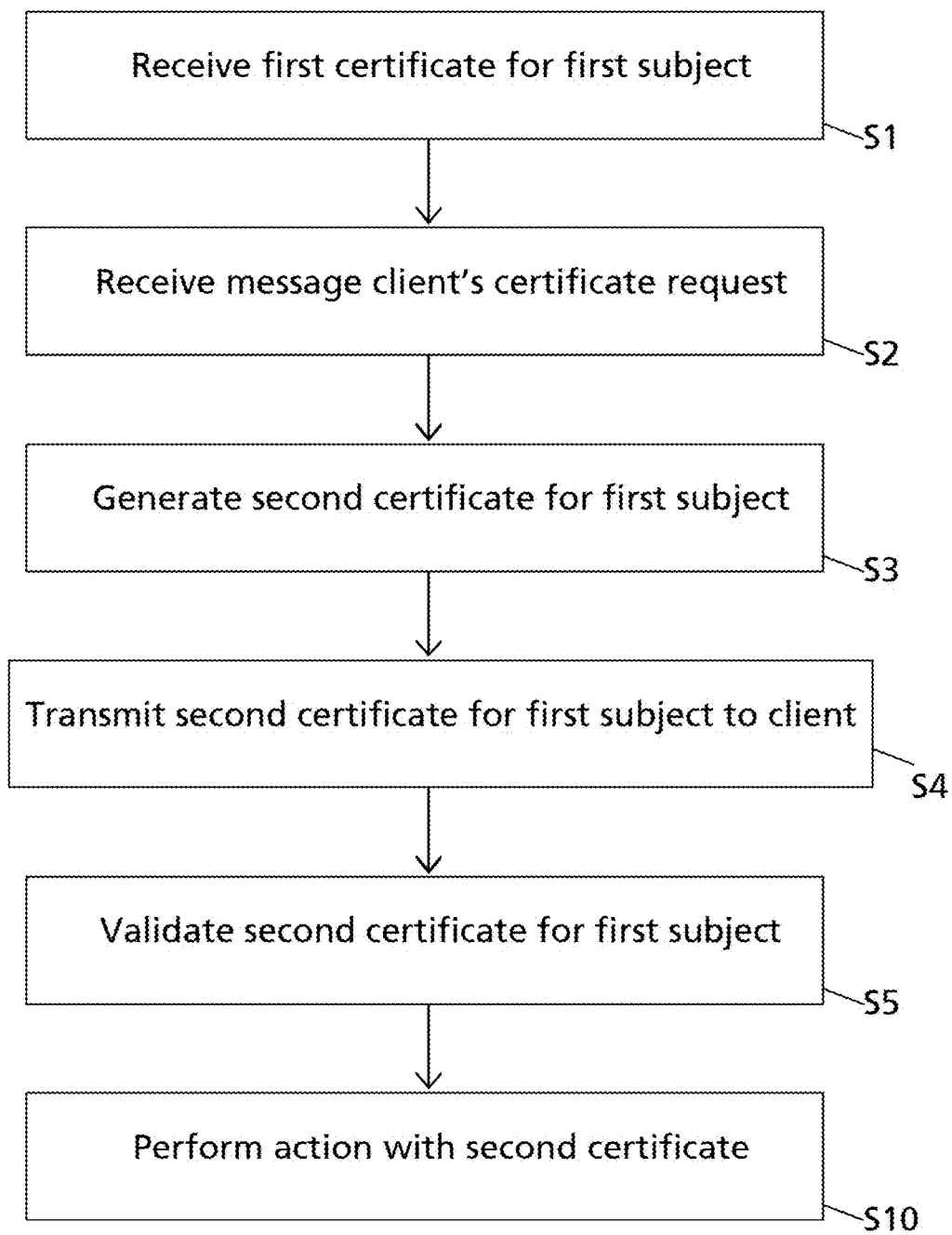
FIG. 7 shows a first embodiment for a method for centralized certificate management.

FIG. 7 shows a first embodiment of a method for central certificate management. The steps are partly also shown in FIG. 5.

Figure 2:
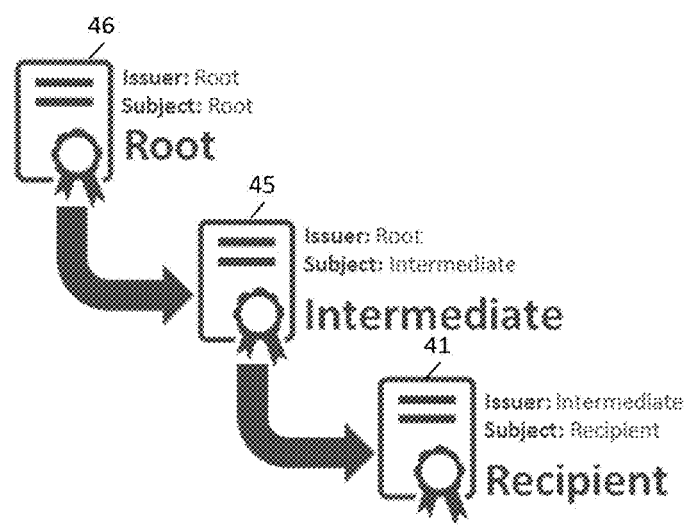
FIG. 2 shows a prior art process for generating and validating a certificate chain.

In a step S1, the certificate management system 31 receives a first certificate for a first subject 21. There are many ways, how the first certificate for the first recipient 21 can be received and the invention is not limited to one of those. In one embodiment, the first certificate for the first subject 21 could be received from the first subject 21. The first certificate of the first subject 21 could be received directly on a request from the certificate management system 31, e.g. upon a request from one of the message clients 11, 12, 13, to the first subject 21 or another device offering the certificate of the first subject 21, e.g. a certificate management system of the first subject 21. In one embodiment, the first certificate for the first subject can be an annex of a message sent to one of the plurality of message clients 11, 12, 13. In this case, a gateway of the message system or the certificate management system 31 could intercept or harvest such a first certificate for the first subject before it reaches one of the message clients 11, 12, 13. Such a process is called "certificate harvesting". Therefore, it is avoided that the message client 11, 12, 13 can store the first certificate of the first subject 21. However, it is also possible that the certificate management system 31 receives the certificate for the first subject 21 from one of the message clients 11, 12, 13 which received it from the first subject 21. The first certificate for the first subject 21 can be received at any time, i.e. before or after or without receiving a request for the certificate for the first subject 21. FIG. 2 shows an exemplary certificate chain of the first certificate 41 for the first subject 21. The first certificate 41 for the first subject 21 is signed by a first certificate for an intermediate (as first issuer). The first certificate 45 for the intermediate is signed by a root certificate 46. However, this is only exemplary and the first certificate 41 could also be signed directly by a root certificate, or the certificate chain could contain additional levels.

In optional step S2, a first message client 11 (one of the plurality of message clients) wants to send an encrypted message, e.g. an email, to the first subject 21 as recipient. Preferably, it checks first locally, if a valid certificate for the first subject 21 is stored in the message client 11. If this is the case, the method could jump to step S5. Otherwise the first message client 11 sends a request for a certificate for the first subject 21. The certificate management system 31 receives the request for a certificate for the first subject 21 from the first message client 11. Such a request could be a LDAP request, but any other request type like EWS (Exchange Web Services), WebDAV, ActiveSync, RPC over HTTP, SMP or FTP etc. is also possible. As mentioned before, such a request is not mandatory for the invention and the message client could receive the second certificate generated in S3 also without any previous request.

In step S3 the certificate management system 31 generates a second certificate for said first recipient 21.

Figure 6:
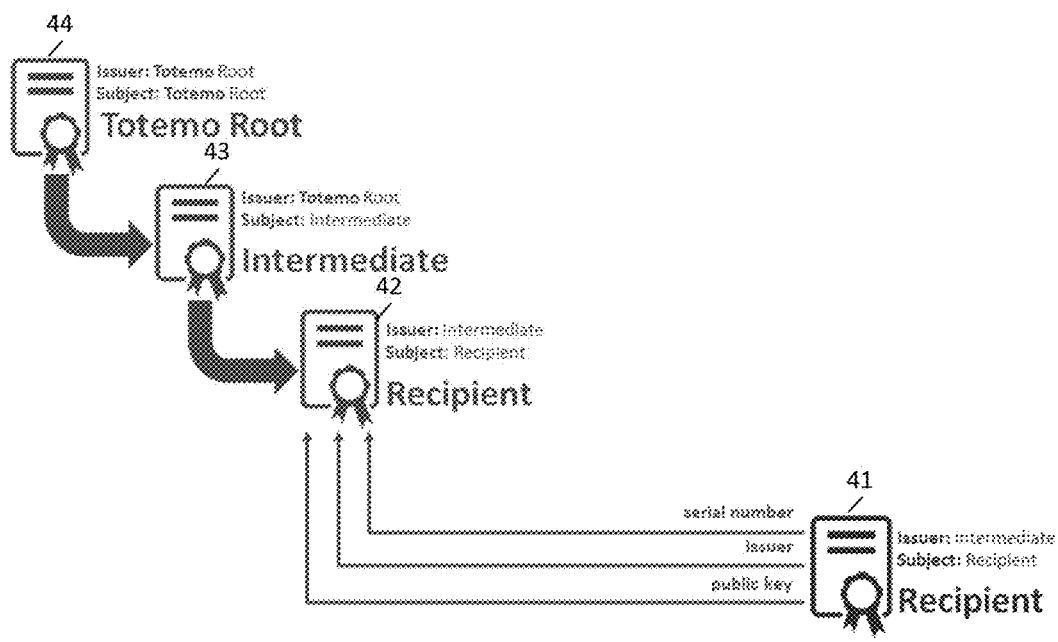
FIG. 6 shows a replacement of the first certificate for the recipient with a second certificate for the recipient at a certificate management system.

FIG. 6 shows an embodiment of the process of generating the second certificate 42 for the first subject 21 on the basis of the first certificate 41 for the first subject 21. The generated second certificate 42 for the first subject 21 comprises the same public key read out from the first certificate 41 for the first subject 21, but is signed by another certificate 43 than the first certificate 41 for the first subject 21. Preferably, at least a part of the further information of the certificate data of the first certificate 41 for the first subject 21 are read out and wrote in the certificate data of the second certificate 42 for the first subject 21. In one embodiment, the content of the serial number field of the first certificate 41 is copied to the serial number field of the second certificate 42. In one embodiment, the content of the issuer field of the first certificate 41 is copied to the issuer field of the second certificate 42. In one embodiment, the content of the subject field of the first certificate 41 is copied to the subject field of the second certificate 42. In one embodiment, the content of the validity field of the first certificate 41 is copied to the validity field of the second certificate 42. In one embodiment, the content of the public key algorithm field of the first certificate 41 is copied to the public key algorithm field of the second certificate 42. In one embodiment, the content of extension fields of the first certificate 41 is copied to the extension fields of the second certificate 42. However, an AIA extension field of the first certificate 41, if present, is preferably not copied to the second certificate 42. In one embodiment, an AIA extension field of the second certificate 42 is generated with the access address for downloading the second certificate 43 for the first issuer. Theoretically the generated AIA or an additional AIA extension could include access information for downloading the root certificate 44. However, in most message clients 11, 12, 13 the trust anchor must be available locally in the list of trusted certificates. Therefore, in many embodiments it is preferred to generate only the AIA information of the second certificate 43 for the first issuer.

When the certificate data of the second certificate 42 for the first subject 21 are complete, the second certificate 42 is signed by the second certificate 43 for the intermediate (first issuer). Even if the subject field of the certificate 43 contains the intermediate and/or corresponds to the issuer field of the certificate 42, it is not the same as the first certificate 45 for the intermediate. Since the certificate management system 31 does not know the private key corresponding to the public key of the first certificate 45 for the intermediate, the certificate management system 31 generates also a new second certificate 43 for the intermediate with a new key pair. If the second certificate 43 was already generated previously, it could be also generated by simply retrieving it from a storage instead of being newly created. Therefore, the second certificate 42 for the first subject 21 can be signed by the second certificate 43 for the intermediate. The second certificate 43 for the intermediate could be directly a root certificate. However, it is preferred that the second certificate 43 for the intermediate is signed by a root certificate 44 (different than the root certificate 46). Thus, the certificate management system 31 has the private key corresponding to the root certificate 44 in order to sign the second certificate 43 for the intermediate by the root certificate 44. The issuer field of the second certificate 43 for the intermediate should correspond to the content of the subject field of the root certificate. The replacement of the certificate path/the root certificate 46 of the first certificate 41 for the first subject 21 by the certificate path/the root certificate 44 of the second certificate 42 for the first subject 21 has the advantage that in all the message clients 11, 12, 13 only the one root certificate 44 has to be included in the list of trusted certificates. Since most of the errors in prior art systems are due to missing or not trusted root certificates, this allows to reduce the errors for handling certificates in the message clients 11, 12, 13. In one embodiment, an AIA extension field of the second certificate 43 for the intermediate is generated with the access address for downloading the root certificate 44 from the message clients 11, 12, 13. In this embodiment, the certificate 44 is the root certificate.

In the preferred embodiment, the certificate chain of the second certificate 42 for the first subject 21 contains the second certificate 43 for the first issuer and the root certificate 44. It is however in further embodiments possible that the certificate 44 is not the root certificate, but is signed itself by another certificate or root certificate. The number of levels of the certificate chain for the second certificate 42 for the first subject 21 is arbitrary. It is also possible that any other certificate than the root certificate of the certificate chain of the second certificate 42 for the first subject 21 is stored in the list of trusted certificates at the message clients 11, 12, 13 as trust anchor.

The second certificate 42 for the first subject 21 could be interpreted as proforma certificate for the first subject 21. The proforma certificate 42 has the same content or at least some same content as the original certificate 41 for the first subject 21, but with another signature and another certificate chain.

The step S3 can further include a test, if the second certificate 42 for the first subject 21 is already stored in the certificate management system 31. If yes, the creation step described before can be skipped and the second certificate 42 for the first subject 21 can be retrieved from a storage or database of the certificate management system 31. Otherwise, the generation step for the second certificate 42 for the first subject 21 is performed as described before. The generation step of the second certificate 42 for the first subject 21 can further include a test, if the second certificate 43 for the intermediate is already stored in the certificate management system 31. This could be the case, if for the same intermediate which issued the first certificate 41 for the first subject 21, but for another subject, a first certificate was received and a second one was created with the corresponding second certificate 43 for the intermediate. If yes, the generation step of the second certificate 43 for the intermediate described before can be skipped and the second certificate 42 for the intermediate can be retrieved from a storage or database of the certificate management system 31. Otherwise, the generation step for the second certificate 43 for the intermediate is performed as described before. In other words, the second certificate 43 for the intermediate can be used for all subjects whose first certificate was issued by the same intermediate.

Figure 3:
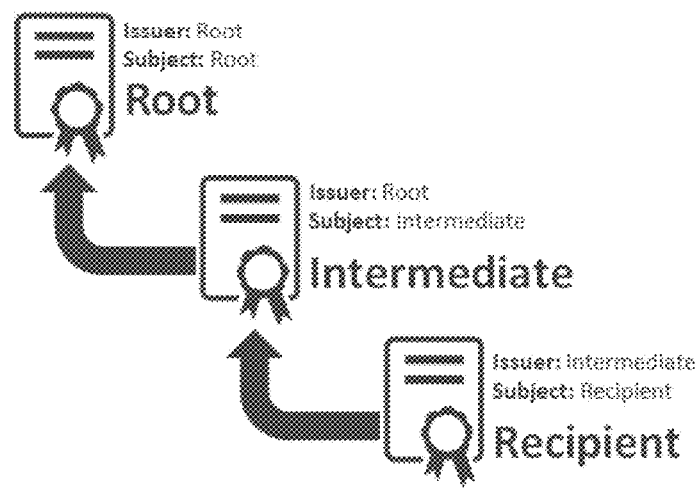
FIG. 3 shows a prior art process for certificate chain construction.
Figure 4:
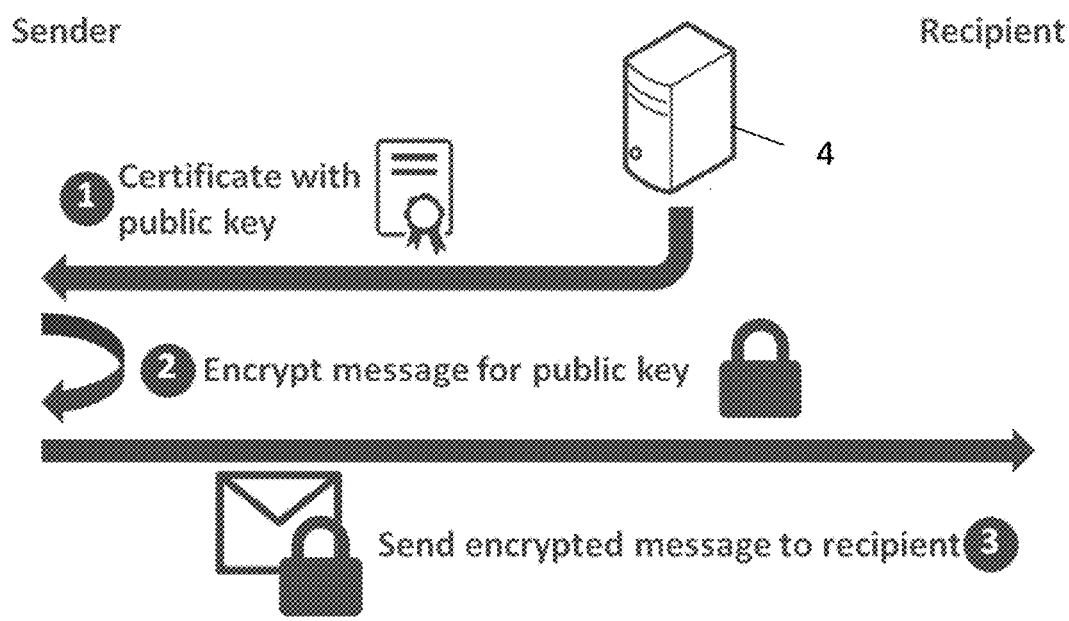
FIG. 4 shows a prior art system for end-to-end encryption with centralized certificate management.

Before generating the second certificate (S3) or before transmitting the second certificate 42 to the message client 11, it could be performed further a step of validating the received first certificate 41 for the first subject 21, e.g. as described with FIGS. 2 and 3. If the first certificate 41 is hold valid, the generation of the second certificate 42 (S3) or the transmitting of the generated second certificate 42 (S4) can be performed. If the first certificate 41 is hold invalid, there are several actions possible: the step S3 or S4 could be skipped and eventually the requesting message client 11 could be informed; the first subject 21 could be requested for a valid certificate; S3 or S4 could be performed anyway and the requesting message client 11 could be warned that the authentication/validation of the public key was problematic.

In step S4, the certificate management system 31 transmits the second certificate 42 for the first subject 21 to the first message client 11. The requesting first message client 11 receives the second certificate 42 for the first subject 21. In one embodiment, the transmission is realized as a reply to the request of step S2. However, the transmission could be also realized without any previous request from the first message client 11. In one embodiment, the transmission of the second certificate 42 for the first subject 21 could be performed by a push message, a message with an annexed second certificate 42 for the first subject 21, e.g. in a V-card. If the first certificate 41 for the first subject 21 was harvested from a message, the first certificate 41 for the first subject 21 of this message could be replaced by the newly generated second certificate 42 for the first subject 21 before being delivered to the first message client 11. The message could for example come from the first subject 21 itself.

In step S5, the first message client 11 validates the second certificate 42 for the first subject 21. Thus, the first message client 11 will perform the certificate chain construction step until it yields the root certificate 44. If the second certificate 43 for the intermediate is not present, the step S5 could further comprise downloading the second certificate 43 for the intermediate on the basis of an AIA extension. It is theoretically possible to download also the root certificate 44 on the basis of AIA extension, but many message clients 11, 12, 13 require that the root certificate 44 is already present locally. Therefore, the message client 11 does not even know that the received second certificate 42 for the first subject 21 and its certificate chain do not correspond to the original first certificate 41 for the first subject 21 and its certificate chain. Therefore, the present solution does not need any special plug-in or add-in or configurations in the message client 11, except that the root certificate 44 must be included in the list of trusted certificates, if this is not already the case. The message client 11 is preferably configured such that it trusts the root certificate 44. This is normally realized by including the root certificate 44 in the list of trusted certificates in each of the plurality of message clients 11, 12, 13. It therefore starts with the certificate chain validation step, by checking the signature of the second certificate 43 for the intermediate on the basis of the public key of the root certificate 44 and by checking the signature of the second certificate 42 for the first subject 21 on the basis of the public key of the second certificate 43 for the intermediate. If the validation is approved, the method continues with step S6. Otherwise, there are different possibilities: a new request could be sent to the certificate management system 31 (especially, if the second certificate 42 for the first subject 21 and/or the second certificate 43 for the intermediate and/or the root certificate 44 are not received from the certificate management system 31, but was/were retrieved locally and might have lapsed); an error message could be given out that the encryption cannot be performed or that the encryption could be not safe.

In step S10, an action is performed in the first message client 11 on the basis of the public key included in the second certificate 42 for the first subject 21.

Figure 8:
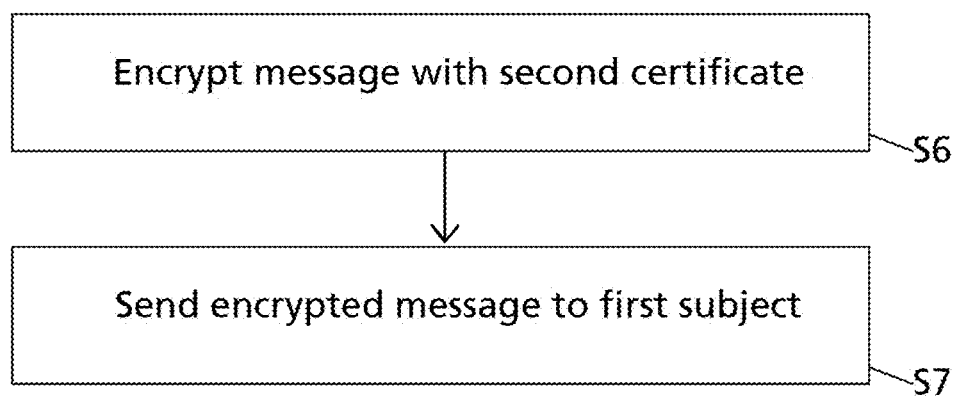
FIG. 8 shows an embodiment for end-to-end encryption with centralized certificate management.

FIG. 8 shows a first example for such a step S10 for end-to-end encryption. In step S6, a message which shall be sent to the first subject 21 is encrypted on the basis of the public key contained in the second certificate 42 for the first subject 21. Preferably, some information of the certificate data of the second certificate 42 is included in the message in order to identify at the recipient 21 the private key corresponding to the second certificate 42. Such information could be the serial number and the issuer. As encryption S/MIME could be used, wherein only a symmetric key used for encrypting the message is encrypted by the public key. The message could be an email, SMS, instant message, . . . . In step S7, the encrypted message is sent to the first subject 21. The encrypted message can be sent directly or via a gateway. Since only the first subject 21 has the corresponding private key, only the first subject 21 will be able to decrypt the message.

Figure 9:
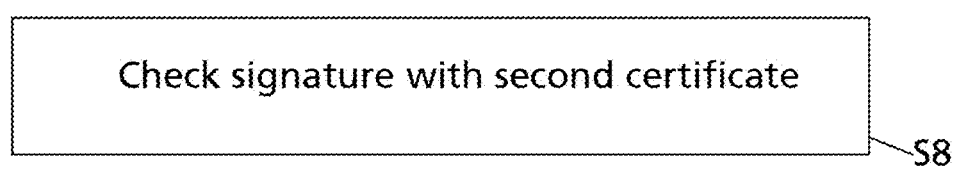
FIG. 9 shows an embodiment for checking the validity of a signature with centralized certificate management.

FIG. 9 shows a second example for such a step S10 for checking a signature of a received message. In step S8, a signature of a received message, preferably from the first subject 21, is checked on the basis of the public key of the second certificate 42 for the first subject 21.

The steps S1 to S10 show a possible order, but shall not imply such an order and shall not limit the invention to this order. The steps are described with the example of the first subject 21 and the first message client 11. However, the same steps apply for all other message clients 12, 13 of the plurality of message clients 11, 12, 13 and for all other subject 22.

Figure 10:
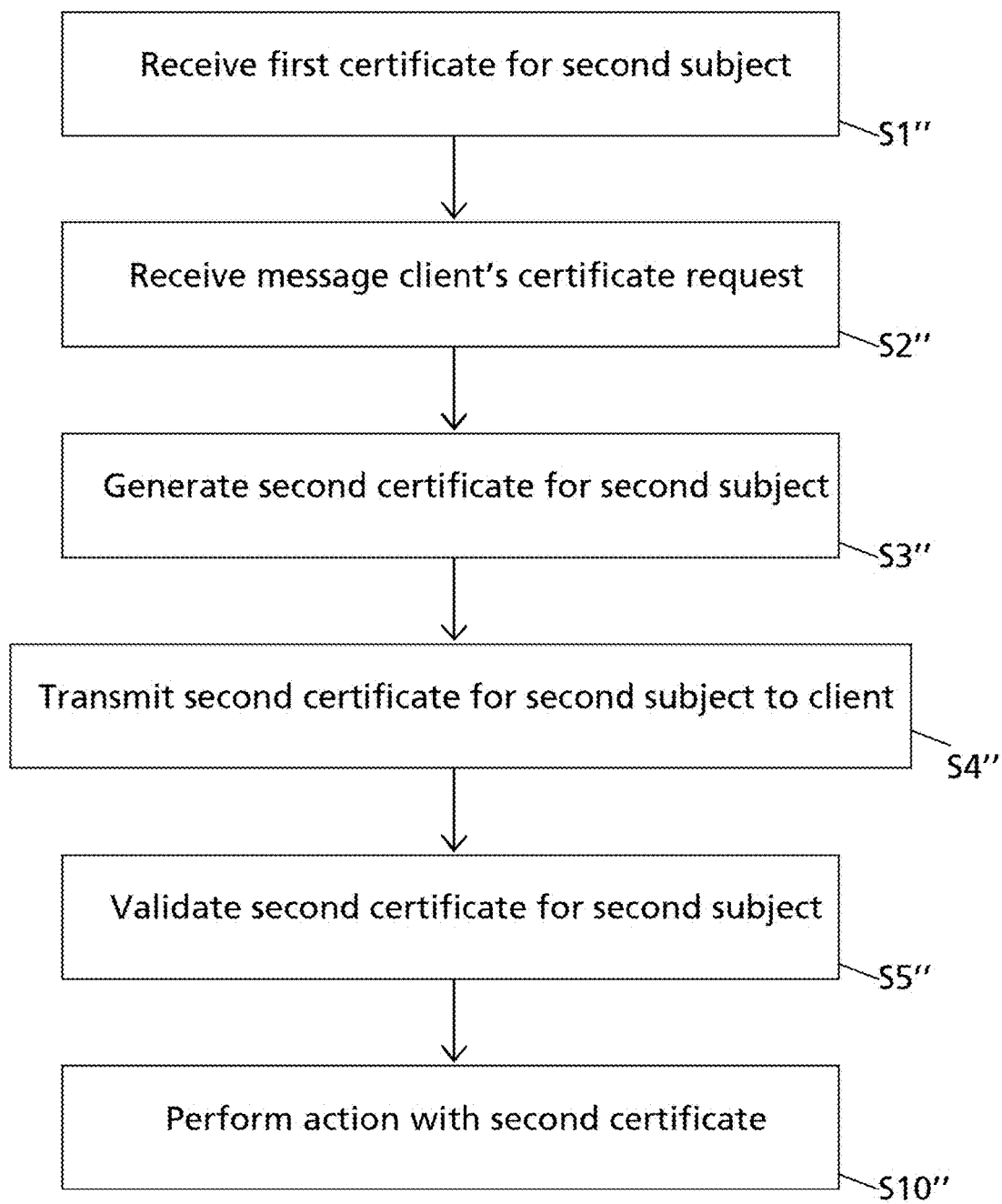
FIG. 10 shows a second embodiment for a method for centralized certificate management.

FIG. 10 shows a second embodiment of a method for central certificate management. The steps are also partly shown in FIG. 5. Those steps could be performed after the steps of FIG. 7.

The steps S1" to S10" correspond to the steps S1 to S10 with the difference that instead of the first message client 11 a third message client 13 different from the first message client 11 receives the second certificate and/or the subject is here a second subject 22 different from the first subject 21. In one advantageous embodiment, the same root certificate 44 is used for the second certificate 42 for the first subject 21 and for the second certificate for the second subject 22, even if the first certificate 41 for the first subject 21 and the first certificate for the second subject 22 had different root certificates. In one embodiment, if the first certificate 41 for the first subject 21 and the first certificate for the second subject 22 are issued by the same intermediate certificate 45, also the same second certificate 43 for the intermediate could be used for the second certificate 42 for the first subject 21 and for the second certificate for the second subject 22.

The above-mentioned system was described for a message system allowing users of the respective message clients to send and receive messages. However, the invention is not restricted to such message systems. The clients could also refer to other system of commands and replies as for example for the internet of things. Each object/thing would correspond to one client and would be configured to receive commands and/or replies and/or to send commands and/or replies. The commands and/or replies could be encrypted and/or signed. In order to check the validity of the certificates, the above-described certificate management could be used for the clients 11, 12, 13. It is also possible to apply such a system to web clients, e.g. for https encryption.

The invention is not restricted to the described embodiments, but all embodiments falling under the scope of protection of the claims shall be protected.

The invention claimed is:

1. A method for certificate management for a plurality of clients performed by a certificate management system with at least one processor configured to perform the steps of:
   receiving a first certificate for a subject, wherein the first certificate for the subject comprises a first public key, an issuer field with a first issuer and a serial number field with a first serial number, wherein the first certificate for the subject is signed by a first certificate for the first issuer;
   generating a second certificate for the subject, wherein the generated second certificate for the subject comprises the first public key, an issuer field with the first issuer and a serial number field with the first serial number, wherein the second certificate for the subject is signed by a second certificate for the first issuer being different to the first certificate for the first issuer;
   receiving a request for the second certificate for the subject from one of the plurality of clients; and
   transmitting the second certificate for the subject to the one of the plurality of clients, so that the one of the plurality of clients can perform a certificate chain validation process for the second certificate for the subject and so that the one of the plurality of clients can store the second certificate for the subject.

2. The method according to claim 1, wherein the first certificate for the first issuer comprises at least one of:
   an issuer field with a second issuer, a serial number field with a second serial number, and a second public key, and
   the second certificate for the first issuer comprises at least one of: an issuer field with a third issuer being different from the second issuer, a serial number field with a third serial number being different from the second serial number, and a third public key being different from the second public key.

3. The method according to claim 1, wherein the second certificate for the first issuer comprises an issuer field with a second issuer and the second certificate is signed by a certificate for the second issuer.

4. The method according to claim 1, wherein the second certificate for the first subject comprises an Authority Information Access Extension in order to allow the one of the plurality of clients receiving the second certificate for the subject to download the second certificate for the first issuer for certificate chain construction.

5. The method according to claim 1, wherein a certificate chain of the first certificate for the subject has a first root certificate and a certificate chain of the second certificate for the subject has a second root certificate being different from the first root certificate.

6. The method according to claim 1, wherein the at least one processor is further configured to perform the steps of:
receiving a first certificate for another subject comprising another first public key, an issuer field with another first issuer and a serial number field with another first serial number, wherein the first certificate for the other subject is signed by a first certificate for the other first issuer;
generating a second certificate for the other subject comprising the other first public key, an issuer field with the other first issuer and a serial number field with the other first serial number, wherein the second certificate for the other subject is signed by a second certificate for the other first issuer being different to the first certificate for the other first issuer, wherein the second certificate for the first issuer and the second certificate for the other first issuer are signed by the same certificate and have the same root certificate; and
transmitting the second certificate for the other subject to one of the plurality of clients.

7. The method according to claim 1, wherein the second certificate for the subject is stored in a storage at the certificate management system.

8. The method according to claim 1, further comprising:
receiving, at one of the plurality of clients, the second certificate for the subject;
performing, at the one of the plurality of clients, a certificate chain validation process for the received second certificate for the subject; and
performing, at the one of the plurality of clients, on the basis of the first public key of the second certificate for the subject:
encrypting a message with the first public key of the second certificate for the subject and sending the encrypted message to the subject; or
checking the signature of a message of the subject on the basis of the first public key of the second certificate for the subject.

9. The method according to claim 8, wherein the second certificate for the subject is stored in a storage at the one of the plurality of clients and further comprising:
checking, if the second certificate for the subject is stored in the storage of the one of the plurality of clients; and
if the second certificate for the subject is not stored in the storage at the one of the plurality of clients, the one of the plurality of clients sending a request for the second certificate for the subject to the certificate management system and receiving the second certificate for the subject from the certificate management system.

10. A method for handling at a client a certificate for a subject, wherein a first certificate for the subject comprises a first public key, an issuer field with a first issuer and a serial number a first serial number, wherein the first certificate for the subject is signed by a first certificate for the first issuer, the method comprising the steps:
requesting, at the client, a second certificate for the subject;
providing, at the client, a second certificate for the subject comprising the first public key, an issuer field with the first issuer and a serial number field with the first serial number, wherein the second certificate for the subject is signed by a second certificate for the first issuer being different to the first certificate for the first issuer, the step of providing the second certificate for the subject comprising:
checking, if the second certificate for the subject is stored in a storage;
if the second certificate for the subject is stored in the storage, retrieving the second certificate for the subject from the storage; and
if the second certificate for the subject is not stored in the storage, sending a request for the second certificate for the subject to a certificate management system;
receiving the second certificate for the subject from the certificate management system;
performing, at the client, a certificate chain validation process for the received second certificate for the subject; and
performing, at the client, an action on the basis of the first public key of the second certificate for the subject.

11. The method according to 10, wherein a first certificate for another subject comprises another public key, an issuer field with another first issuer and a serial number field with another first serial number, wherein the first certificate for the other subject is signed by a first certificate for the other first issuer, wherein the method comprises:
retrieving a second certificate for the other subject comprising the other public key of the first certificate for the other subject, an issuer field with the other first issuer and a serial number field with the first serial number, wherein the second certificate for the other subject is signed by a second certificate for the other first issuer being different to the first certificate for the other first issuer, wherein the second certificate for the first issuer and the second certificate for the other first issuer are signed by the same certificate and have the same root certificate;
performing a certificate chain validation process for the received second certificate for the other subject; and
performing, at the client, an action on the basis of the other first public key of the second certificate for the other subject.

12. A non-transitory computer-readable medium having a program stored therein for certificate management for a plurality of clients configured to perform the following steps, when executed on one or more processor(s):
receiving a first certificate for a subject, wherein the first certificate for the subject comprises a first public key, an issuer field with a first issuer and a serial number field with a first serial number, wherein the first certificate for the subject is signed by a first certificate for the first issuer;
generating a second certificate for the subject, wherein the generated second certificate for the subject comprise the first public key, an issuer field with the first issuer and a serial number field with the first serial number, wherein the second certificate for the subject is signed by a second certificate for the first issuer being different to the first certificate for the first issuer; and transmitting the second certificate for the subject to one of the plurality of clients, so that the one of the plurality of clients can perform a certificate chain validation process for the second certificate for the subject and so that the one of the plurality of clients can store the second certificate for the subject.

13. The non-transitory computer-readable medium having the program stored therein according to claim 12, wherein the first certificate for the first issuer comprises at least one of: an issuer field with a second issuer, a serial number field with a second serial number, and a second public key; and the second certificate for the first issuer comprises at least one of: an issuer field with a third issuer being different from the second issuer, a serial number field with a third serial number being different from the second serial number and a third public key being different from the second public key.

14. The non-transitory computer-readable medium having the program stored therein according to claim 12, wherein the second certificate for the first issuer comprises an issuer field with a second issuer and the second certificate is signed by a certificate for the second issuer.

15. The non-transitory computer-readable medium having the program stored therein according to claim 12, wherein the second certificate for the first subject comprises an Authority Information Access Extension in order to allow the one of the plurality of clients receiving the second certificate for the subject to download the second certificate for the first issuer for certificate chain construction.

16. The non-transitory computer-readable medium having the program stored therein according to claim 12, wherein a certificate chain of the first certificate for the subject has a first root certificate and a certificate chain of the second certificate for the subject has a second root certificate being different from the first root certificate.

17. The non-transitory computer-readable medium having the program stored therein according to claim 12, wherein the steps comprise further:

receiving a first certificate for another subject comprising another first public key, an issuer field with another first issuer and a serial number field with another first serial number, wherein the first certificate for the other subject is signed by a first certificate for the other first issuer;

generating a second certificate for the other subject comprising the other first public key, an issuer field with the other first issuer and a serial number field with the other first serial number, wherein the second certificate for the other subject is signed by a second certificate for the other first issuer being different to the first certificate for the other first issuer, wherein the second certificate for the first issuer and the second certificate for the other first issuer are signed by the same certificate and have the same root certificate;

transmitting the second certificate for the other subject to one of the plurality of clients.

18. The non-transitory computer-readable medium having the program stored therein according to claim 12, wherein the steps comprise further:

storing the second certificate for the subject in a storage; and sending the second certificate for the subject to another of the plurality of clients.

19. A certificate management system for managing certificates for a plurality of clients comprising:

a memory storing instructions for certificate management;
at least one processor configured to execute the instructions and:

receive a first certificate for a subject comprising a first public key, an issuer field with a first issuer and a serial number field with a first serial number, wherein the first certificate for the subject is signed by a first certificate for the first issuer;

generate a second certificate for the subject comprising the first public key, an issuer field with the first issuer and a serial number field with the first serial number, wherein the second certificate for the subject is signed by a second certificate for the first issuer being different to the first certificate for the first issuer; and transmit the second certificate for the subject to one of the plurality of clients, so that the one of the plurality of clients can perform a certificate chain validation process for the second certificate for the subject and so that the one of the plurality of clients can store the second certificate for the subject.

* * * * *